US012703026B2

(12) United States Patent
Silva et al.

(10) Patent No.: US 12,703,026 B2
(45) Date of Patent: Aug. 11, 2026

(54) AUTOMATIC INDEXING FOR CUTTING INSERT

(71) Applicant: KENNAMETAL INC., Latrobe, PA (US)

(72) Inventors: Marcelo Euripedes Silva, Piracicaba (BR); Pavel Pecher, Unicov (CZ)

(73) Assignee: KENNAMETAL INC., Latrobe, PA (US)

( * ) Notice: Subject to any disclaimer, the term of this patent is extended or adjusted under 35 U.S.C. 154(b) by 619 days.

(21) Appl. No.: 18/182,351

(22) Filed: Mar. 12, 2023

(65) Prior Publication Data

US 2024/0300042 A1 Sep. 12, 2024

(51) Int. Cl.
*B23B 29/04* (2006.01)
*B23F 23/08* (2006.01)

(52) U.S. Cl.
CPC ...... *B23B 29/04* (2013.01); *B23B 2200/0461* (2013.01); *B23B 2200/3627* (2013.01); *B23B 2205/18* (2013.01)

(58) Field of Classification Search
CPC .... B23B 2200/0461; B23B 2200/3627; B23B 29/04; B23B 2205/18; B23B 27/14; B23B 2260/104
See application file for complete search history.

(56) References Cited

U.S. PATENT DOCUMENTS 280,148 A * 6/1883 Name .................. B23B 27/083 407/112
1,577,952 A * 3/1926 Carnegie ............. B23B 27/1625 407/103
1,673,039 A * 6/1928 Brown .................. B23B 27/083 407/91
2,630,732 A * 3/1953 Piazze ..................... B23B 27/12 407/7
3,368,265 A * 2/1968 Kirkham ............. B23B 27/1662 29/713
3,793,708 A * 2/1974 Watanabe ........... B23B 27/1666 82/158
3,838,500 A * 10/1974 Wirfelt .................... B23B 27/00 82/158
3,981,607 A * 9/1976 Jorgensen ............ B23B 27/164 408/188

(Continued)

FOREIGN PATENT DOCUMENTS

CN 112620759 A 4/2021
DE 2424790 A * 11/1975

(Continued)

OTHER PUBLICATIONS

Jan. 20, 2026 Non Final Rejection U.S. Appl. No. 18/182,352, 08 Pages.

*Primary Examiner* — Sara Addisu
(74) *Attorney, Agent, or Firm* — John A. Wilaj, Jr.

(57) ABSTRACT

A cutting system may include a tool and a stationary fixture. The tool may include a cam connected with a cutting insert. The stationary fixture may be spaced apart from the tool. The stationary fixture may include a gear moveable within the stationary fixture. The cam of the tool may be configured to be moved into contact with the gear of the stationary fixture. The stationary fixture may be configured to index the cutting insert.

19 Claims, 8 Drawing Sheets

(56) References Cited

U.S. PATENT DOCUMENTS 3,996,651 A * 12/1976 Heaton ............... B23B 27/1662 407/104
4,018,112 A 4/1977 Heaton et al.
4,024,777 A * 5/1977 Fogarty .................. B23Q 16/06 408/35
4,326,437 A * 4/1982 Fischer ................. B23B 27/083 82/159
4,408,507 A * 10/1983 Szewczyk ............... B23B 27/00 82/158
4,414,733 A * 11/1983 Janotik ............... B23B 27/1666 82/159
4,541,165 A * 9/1985 Sawai ..................... B23B 27/00 408/35
4,663,818 A * 5/1987 Erickson ................. B23B 27/00 82/160
5,733,073 A * 3/1998 Zitzlaff ................... B23B 27/16 407/107
5,846,032 A * 12/1998 Murakami .......... B23B 27/1622 407/104
5,855,457 A * 1/1999 Arai ...................... B23C 5/2208 407/53
6,158,928 A * 12/2000 Hecht ................. B23B 27/1622 407/103
6,991,410 B2 * 1/2006 Andras ............... B23B 27/1655 407/107
7,607,867 B2 * 10/2009 Benson ................. B23B 27/164 407/66
9,737,939 B2 * 8/2017 Norstedt ............... B23C 5/2213
9,981,324 B2 * 5/2018 Norstedt ............... B23C 5/2239
11,786,982 B2 * 10/2023 Dufour ..................... B23C 5/06 407/113
12,097,563 B2 * 9/2024 Lindback .............. B23C 5/2208
2005/0079019 A1 * 4/2005 Andras ............... B23B 27/1655 407/107
2005/0166727 A1 8/2005 Peltonen et al.
2007/0009334 A1 * 1/2007 Edler .................... B23B 29/043 407/107
2008/0145159 A1 * 6/2008 Benson ................. B23B 27/164 407/114
2014/0186127 A1 * 7/2014 Parker ..................... B23B 27/08 407/7
2017/0028483 A1 2/2017 Norstedt et al.
2020/0331074 A1 10/2020 Endres
2021/0362247 A1 11/2021 Lindback et al.
2023/0294179 A1 * 9/2023 da Silva ............ B23B 29/03403 408/19
2024/0300029 A1 * 9/2024 Silva ....................... B23B 29/12
2025/0269436 A1 * 8/2025 Hecht ..................... B23B 27/16

FOREIGN PATENT DOCUMENTS

DE 4411400 A1 * 11/1995 ............. B23B 27/16
DE 19846548 A1 * 5/2000 ............. B23B 27/00
DE 102013222206 A1 * 4/2015 ........... B23B 27/164
EP 183907 A * 11/1986
EP 350938 A * 1/1990
EP 3064299 A1 * 9/2016 ........... B23B 27/164
GB 1137652 A 12/1968
JP 55037220 A * 3/1980
JP 55037221 A * 3/1980
JP 55037222 A * 3/1980
JP 03281105 A * 3/1991
WO 16193170 A1 12/2016
WO WO-2019242897 A1 * 12/2019 ........... B23C 5/2295

* cited by examiner 15
14
18
14b
12
17
20
45
14a
22
22d
13
26d
26d 34
32
26
15
14
14b
18
12
20
17
14a
22
14d
22d
13
33
25

13a
26a
28
26
26b
47
34
32

22d
39
22d
22
S1
S2
S1
24
14e
14f
41
43

22d
24
14f
14e
22d
S1
22
22d

AUTOMATIC INDEXING FOR CUTTING INSERT

FIELD OF THE DISCLOSURE

The disclosure relates to a cutting system which automatically indexes a cutting insert.

BACKGROUND

Cutting inserts of cutting systems may be indexed to switch-out the portion of the cutting insert doing the cutting to extend the life of the cutting insert. Existing cutting systems and methods of their use often utilize complicated motorized indexing systems. This may lead to additional cost, costly repairs, and more down-time.

An improved cutting system and method of its use is needed to reduce one or more of the issues associated with indexing one or more of the existing cutting systems and methods of their use.

SUMMARY

In one embodiment, a cutting system may include a tool and a stationary fixture. The tool may include a cam connected with a cutting insert. The stationary fixture may be spaced apart from the tool. The stationary fixture may include a gear moveable within the stationary fixture. The cam of the tool may be configured to be moved into contact with the gear of the stationary fixture. The stationary fixture may be configured to index the cutting insert.

In another embodiment, a cutting system may include a machine, a tool, and a stationary fixture. The tool may include a cutting insert and a cam connected with the cutting insert. The stationary fixture may be spaced apart from the tool. The stationary fixture may include a gear moveably mated with a rack. The machine may be configured to move the cam into contact with the gear of the stationary fixture. The rack may be configured to rotate the gear as the machine moves the tool relative to the stationary fixture. The gear may be configured to rotate the cam causing the cutting insert to index.

In still another embodiment, a method of indexing a cutting insert of a tool is disclosed. In one step, the tool may be moved with a machine to dispose a cam of the tool into contact with a gear of a stationary fixture. In another step, the cutting insert of the tool may be subsequently indexed with the stationary fixture as the machine moves the tool relative to the stationary fixture.

The scope of the present disclosure is defined solely by the appended claims and is not affected by the statements within this summary.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

DETAILED DESCRIPTION

Figure 1:
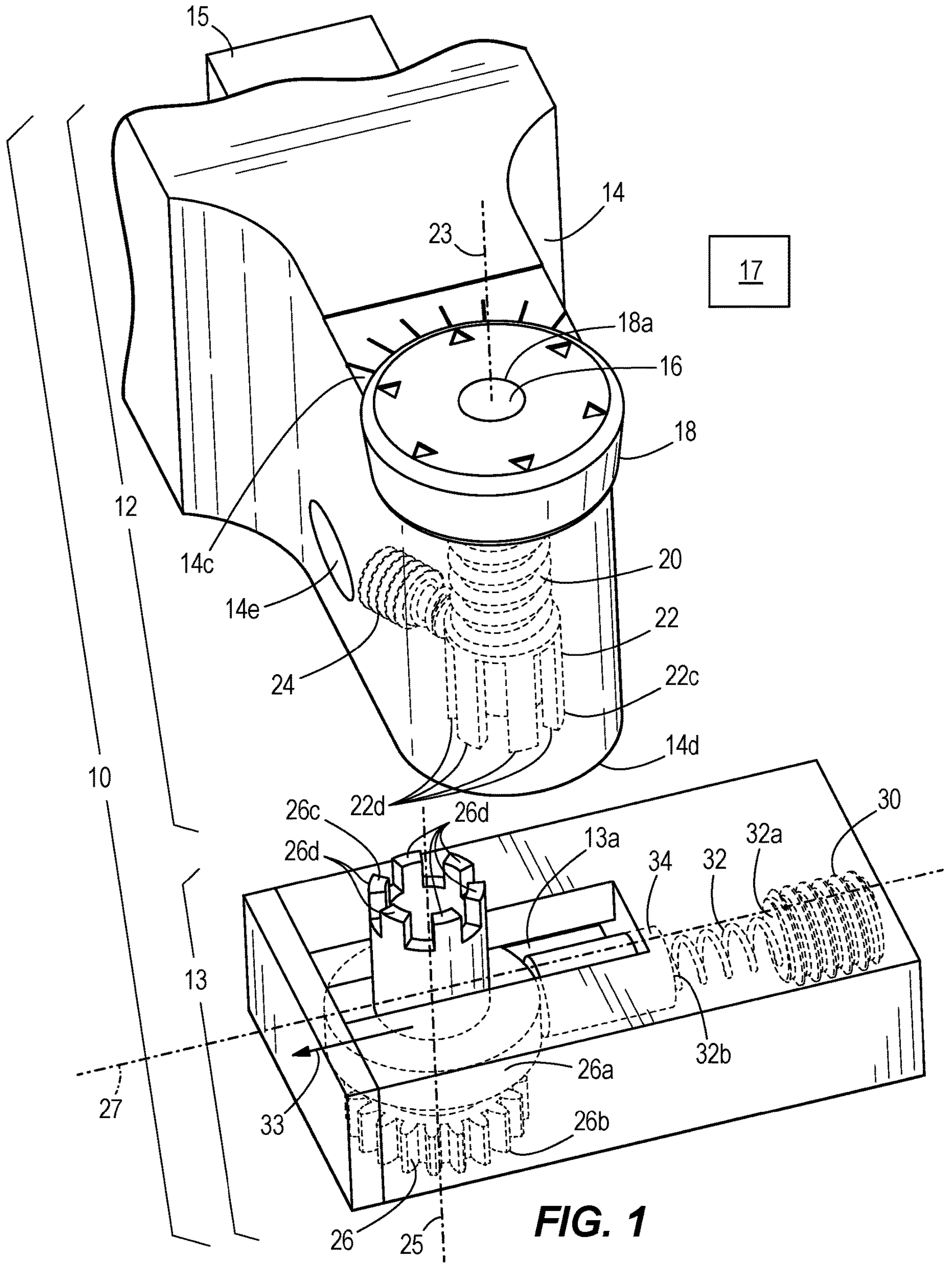
FIG. 1 illustrates a top perspective view of one embodiment of a cutting system with a tool of the cutting system spaced-apart from a stationary fixture of the cutting system.
Figure 2:
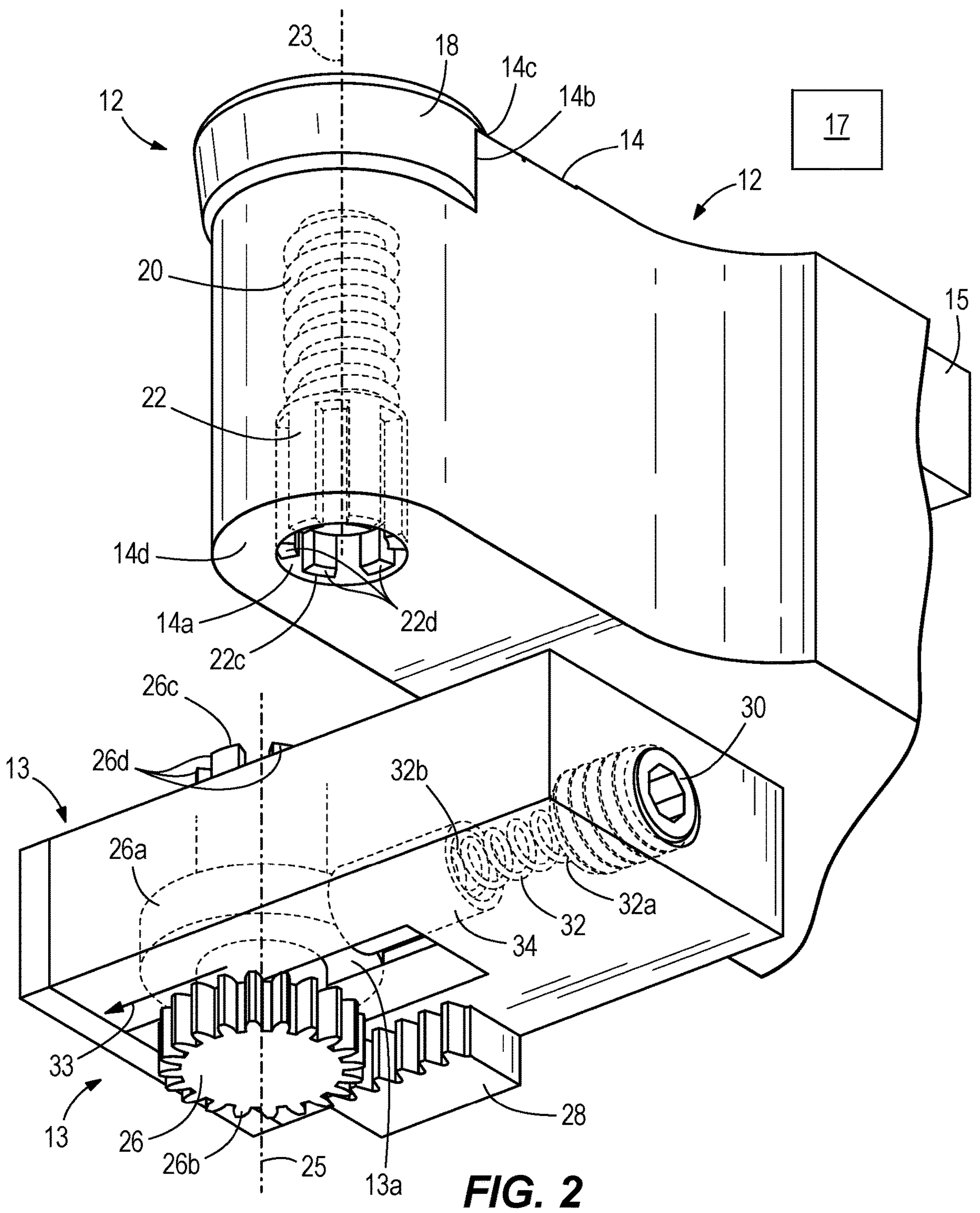
FIG. 2 illustrates a bottom perspective view of the cutting system of FIG. 1.
Figure 3:
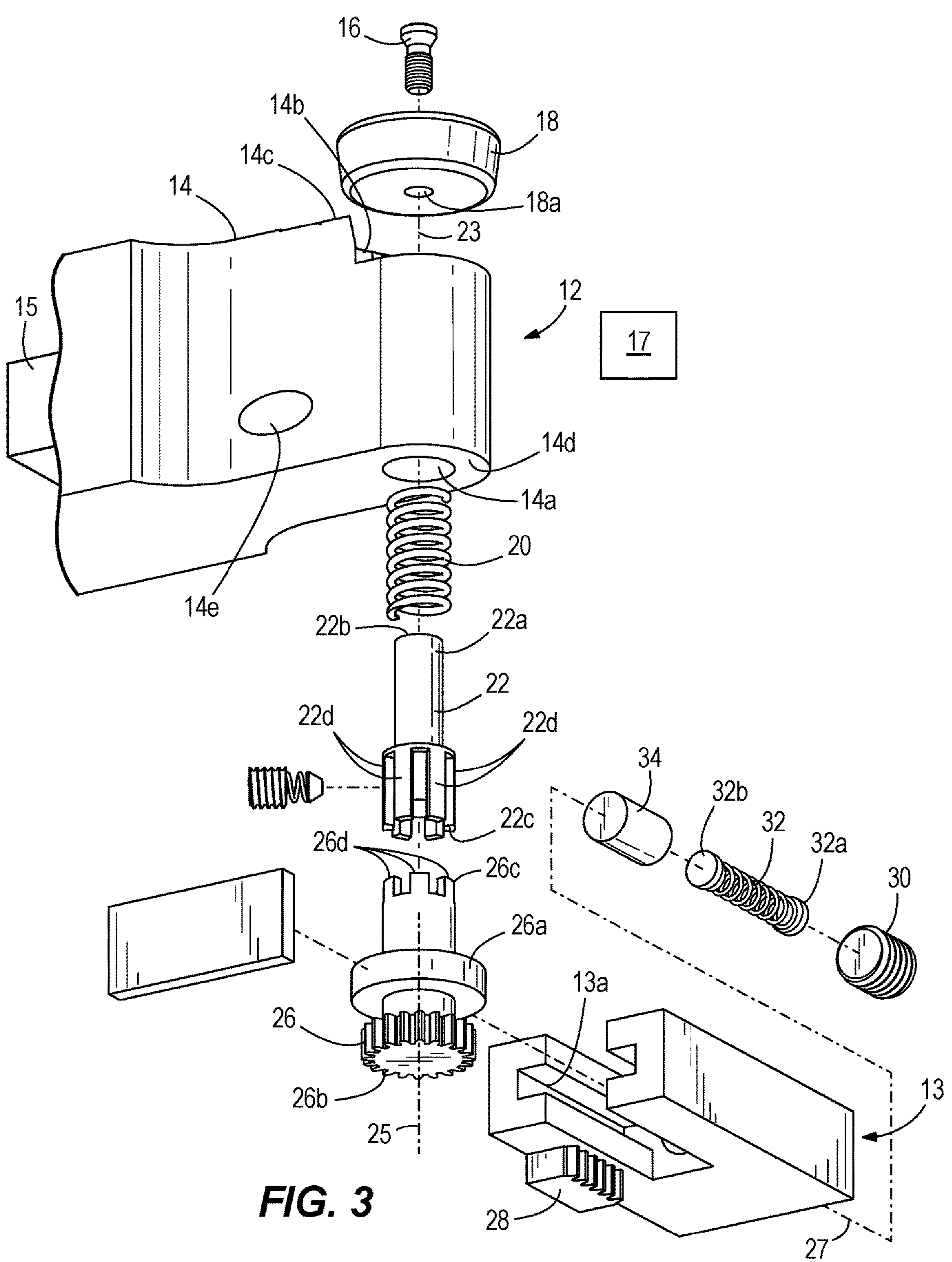
FIG. 3 illustrates a disassembled view of the cutting system of FIG. 1.

As shown collectively in FIGS. 1-3, in one embodiment a cutting system 10 may include a tool 12, a stationary fixture 13, a machine 15, and a processor 17. The machine 15 may be controlled by the processor 17 to move the tool 12. The machine 15 may comprise an interface of a machine tool.

The tool 12 may comprise a tool holder 14, a fastening member 16, a cutting insert 18, a biasing member 20, a cam 22, and a plunger 24. A shaft **22*a* of the cam 22 may disposed within a through-hole 14*a* in the tool holder 14. The biasing member 20 may extend over the shaft 22*a* in the through-hole 14*a* of the tool holder 14. The biasing member 20 may comprise a spring. In other embodiments, the biasing member 20 may vary. The fastening member 16 may attach the cutting insert 18 to the cam 22. The fastening member 16 may comprise a screw. The fastening member 16 may extend through a hole 18*a* in the cutting insert 18 and be threadedly attached to one end 22*b* of the cam 22 connecting the cam 22 with the cutting insert 18. The cutting insert 18 may be cylindrical. In other embodiments, the cutting insert 18 may vary in shape. The cutting insert 18 may be disposed within and against a pocket 14*b* at one end 14*c* of the tool holder 14 with an interference fit preventing the cutting insert 18 from rotating relative to the pocket 14*b*. The cam 22 and attached cutting insert 18 may be moveably disposed vertically relative to the tool holder 14 along axis 23. This relative movement along axis 23 may allow the cutting insert 18 to be relatively moved vertically out of the interference fit of the pocket 14***b* to allow the cutting insert 18, and attached cam 22, to rotate around axis 23 relative to the tool holder 14. The biasing member 20 may bias the cutting insert 18 along axis 23 towards the pocket 14*b*.

Another end 22*c* of the cam 22 may comprise mating members 22*d* disposed within the through-hole 14*a* adjacent another end 14*d* of the tool holder 14. The mating members 22*d* may comprise spaced-apart teeth extending circumferentially around the cam 22. In other embodiments, the mating members 22*d* may vary in type, shape, configuration, and size. For instance, in another embodiment the mating members 22*d* may comprise serrated teeth. The plunger 24 may be disposed through a blind-hole 14*e* in the tool holder 14. The blind-hole 14*e* may intersect the through-hole 14*a*. As shown best in FIG. 10, the plunger 24 may be disposed against the cam 22. The plunger 24 may be moveably disposed back and forth along axis 14*f* within the blind-hole 14*e* relative to the cam 22 and configured to be disposed between the mating members 22*d* to keep a rotated position of the cam 22 after each indexing.

Figures 4, 5:
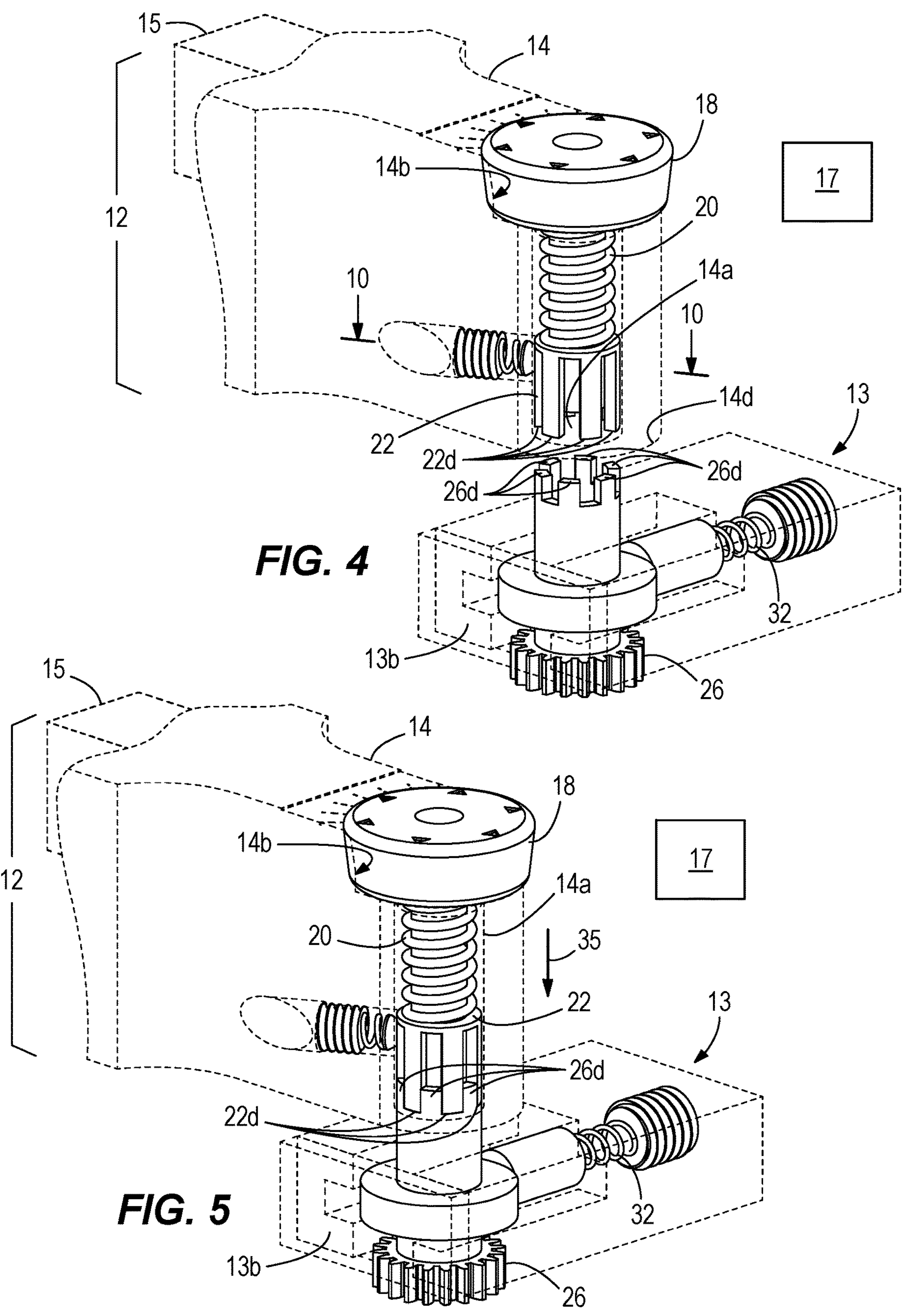
FIG. 4 illustrates a top perspective view of the cutting system of FIG. 1 with the tool disposed directly over and spaced-apart from a gear of the stationary fixture in an extended position.
FIG. 5 illustrates a top perspective view of the cutting system of FIG. 4 with a machine of the cutting system having moved a tool holder of the cutting system towards the stationary fixture to dispose a cam of the tool into contact with the gear of the stationary fixture.
Figures 8, 9:
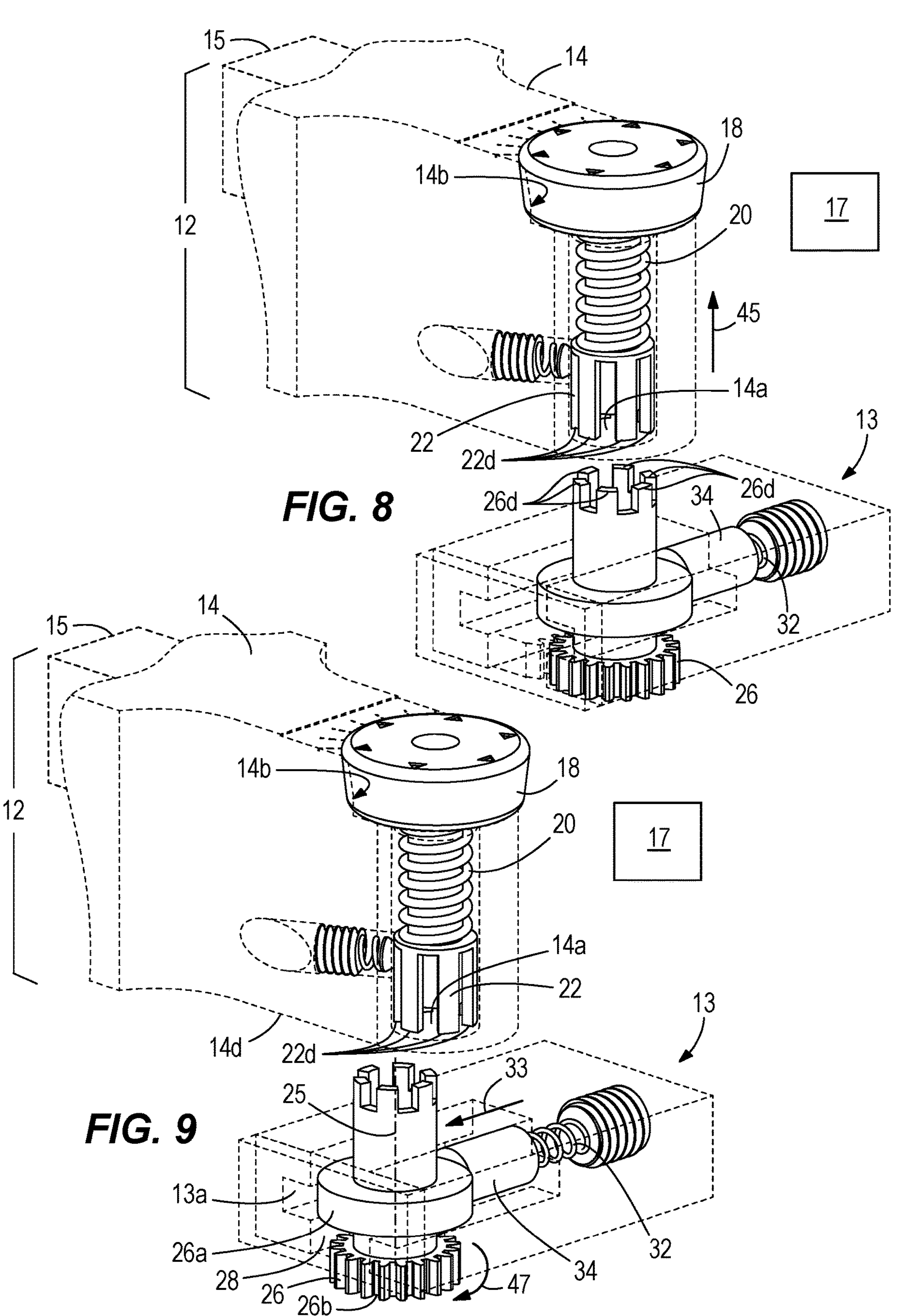
FIG. 8 illustrates the top perspective view of the cutting system of FIG. 7 with the machine having moved the tool holder away from the stationary fixture causing the cam to separate from the gear causing a biasing member of the tool to relatively move the cutting insert back into the pocket of the tool holder.
FIG. 9 illustrates the top perspective view of the cutting system of FIG. 8 with a biasing member of the stationary fixture having moved the gear back into its extended position.

The stationary fixture 13 may be spaced apart from the tool 12. The stationary fixture 13 may comprise a gear 26, a rack 28, a fastener 30, a biasing member 32, and a pin member 34. The stationary fixture 13 and its rack 28 may be stationary within the cutting system 10. The stationary fixture 13 may be rectangular. A middle portion 26*a* of the gear 26 may be disposed within a slot 13*a* of the stationary fixture 13. The slot 13*a* of the stationary fixture 13 may be sized to prevent the middle portion 26 from moving vertically out of the slot 13*a* in directions 35 and 45 as shown in FIGS. 5 and 8. The gear 26 may rotate around axis 25 while the middle portion 26*a* of the gear 26 moves laterally along axis 27 within the slot 13*a*. One end 26*b* of the gear 26 may mate/mesh with and move relative to the rack 28 causing the entire gear 26 to rotate around axis 25 and move laterally along axis 27. Another end 26*c* of the gear 26 may comprise mating members 26*d*. The mating members 26*d* may extend out of the slot 13*a*. The mating members 26*d* may comprise spaced-apart teeth extending circumferentially around the gear 26. In other embodiments, the mating members 26*d* may vary in type, shape, configuration, and size. For instance, in another embodiment the mating members 26*d* may comprise serrated teeth.

The fastener 30 may attach to one end 32*a* of the biasing member 32 attaching the biasing member 32 within the slot 13*a* of the stationary fixture 13. The biasing member 32 may be disposed within a cylindrical portion of the stationary fixture. The fastener 30 may comprise a screw and the biasing member 32 may comprise a spring. In other embodiments, the fastener 30 and biasing member 32 may vary. The pin member 34 may be attached to the other end 32*b* of the biasing member 32 within the slot 13*a*. The middle portion 26*a* of the gear 26 may be disposed against the pin member 34. The biasing member 32 may bias the gear 26 in direction 33 relative to the rack 28.

As discussed in more detail below, the processor 17 may cause the machine 15 to move the tool 12 relative to the stationary fixture 13 so that the stationary fixture 13 automatically indexes the cutting insert 18. The stationary fixture 13 may be purely mechanical without any motor or electronic components.

At the start of an indexing action, as shown in FIG. 4, the processor 17 may cause the machine 15 to dispose the tool holder 14 in a raised position with the mating members 22*d* of the cam 22 disposed in spaced-apart relation directly over the mating members 26*d* of the gear 26 of the stationary fixture 13. In this position, the tool 12 may be spaced-apart from the stationary fixture 13. The mating members 22*d* of the cam 22 may be disposed completely within the through-hole 14*a* of the tool holder 14 adjacent the end 14*d* of the tool holder 14. Due to the biasing member 20 of the tool 12 biasing the cutting insert 18 towards the pocket 14*b*, the cutting insert 18 may be disposed within and against the pocket 14*b* of the tool holder 14 prevented from rotating due to the interference fit of the pocket 14*b* against the cutting insert 18. As shown best in FIG. 10, the plunger 24 may be disposed in-between a first set S1 of the spaced-apart mating members 22*d* of the cam 22 keeping a rotated position of the cam 22. The gear 26 of the stationary fixture 13 may be disposed at an end 13*b* of the stationary fixture 13 due to the biasing member 32 of the stationary fixture 13 biasing the gear 26 to the end 13*b*.

The processor 17 may then cause the machine 15 to move the tool holder 14 from the position of FIG. 4 in direction 35 towards the stationary fixture 13 to the intermediate position of FIG. 5 with the mating members 22*d* of the cam 22 coming into contact and mating with the mating members 26*d* of the gear 26. As shown, the spaced-apart teeth of the mating members 22*d* may fill the respective spaces between the spaced-apart teeth of the mating members 26*d*. In this position, the tool 12 may now be in contact with the stationary fixture 13. The mating members 22*d* of the cam 22 have not yet moved relative to the tool holder 14 within the through-hole 14*a* of the tool holder 14. Due to the biasing member 20 of the tool 12 biasing the cutting insert 18 towards the pocket 14*b*, the cutting insert 18 may still be disposed within and against the pocket 14*b* of the tool holder 14 prevented from rotating due to the interference fit of the pocket 14*b* against the cutting insert 18. As shown best in FIG. 10, the plunger 24 may still be disposed in-between the first set S1 of the spaced-apart mating members 22*d* of the cam 22 keeping the rotated position of the cam 22. The gear 26 of the stationary fixture 13 may still be disposed at the end 13*b* of the stationary fixture 13 due to the biasing member 32 of the stationary fixture 13 biasing the gear 26 to the end 13*b*.

Figures 6, 7:
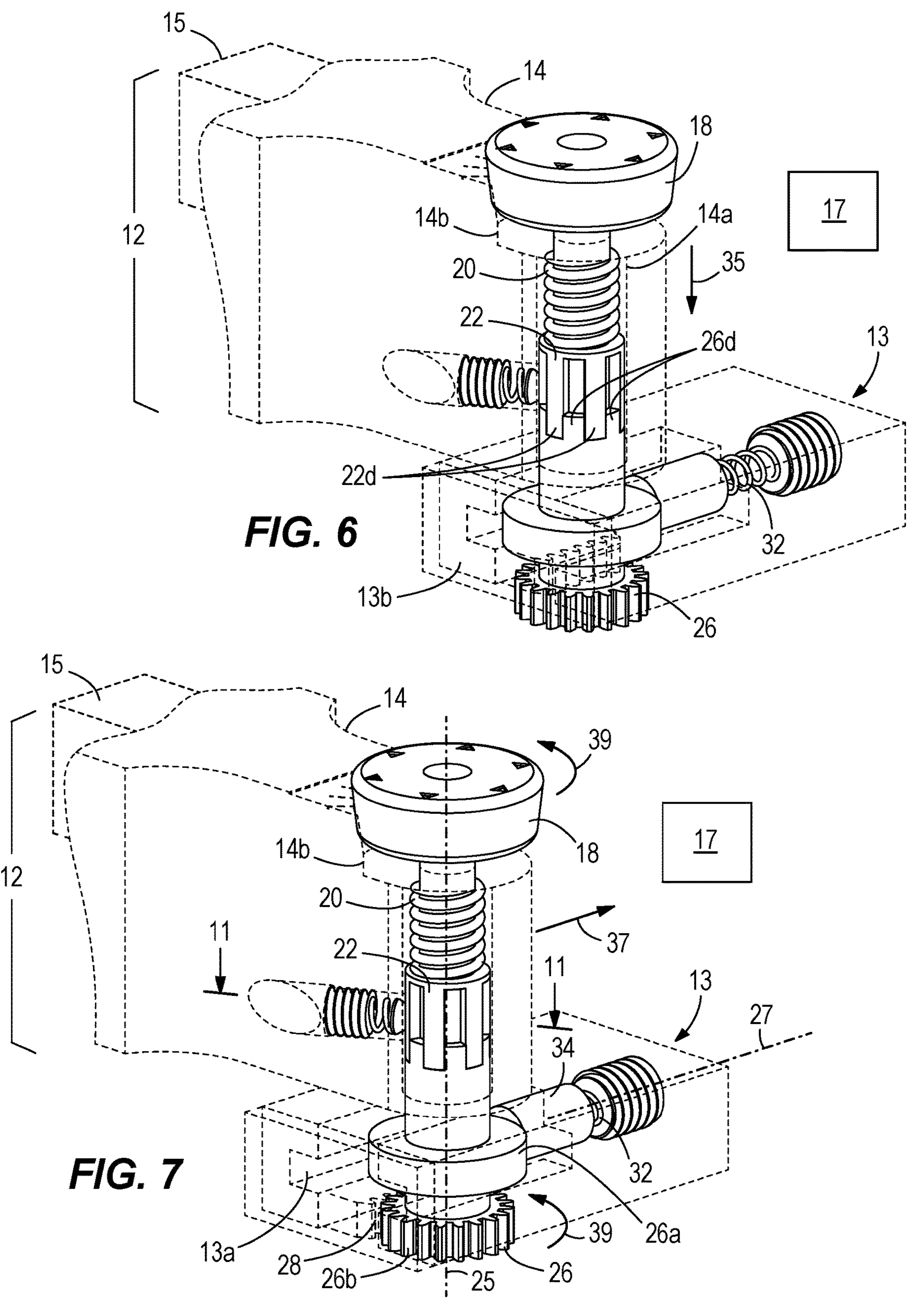
FIG. 6 illustrates a top perspective view of the cutting system of FIG. 5 with the machine having advanced the tool holder further towards the stationary fixture with the cam restrained against the gear to force a cutting insert of the tool to move out of a pocket of the tool holder.
FIG. 7 illustrates the top perspective view of the cutting system of FIG. 6 with the machine having moved the tool holder parallel to the stationary fixture with a rack of the stationary fixture causing the gear, cam, and cutting insert to rotate and index.

The processor 17 may then cause the machine 15 to move the tool holder 14 from the position of FIG. 5 further in direction 35 towards the stationary fixture 13 to the lowered position of FIG. 6 with the mating members 22*d* of the cam 22 prevented by the mating members 26*d* of the gear 26 from moving further in direction 35. This may cause the cam 22 to move relative to the tool holder 14 within the through-hole 14*a* of the tool holder 14 due to the tool holder 14 moving in direction 35 relative to the cam 22 which may be stationary. This movement of the tool holder 14 relative to the cam 22 may cause the cutting insert 18 to be relatively moved away from the pocket 14*b* of the tool holder 14. During this movement of the tool holder 14 in direction 35, the biasing member 20 of the tool 12 may be compressed in direction 35. The movement of the tool holder 14 relative to the cutting insert 18 may cause the cutting insert 18 to no longer be constrained from rotation due to the interference fit of the pocket 14*b* having been removed from the cutting insert 18. As shown best in FIG. 10, the plunger 24 may still be disposed in-between the first set S1 of the spaced-apart mating members 22*d* of the cam 22 keeping the rotated position of the cam 22. The gear 26 of the stationary fixture 13 may still be disposed at the end 13*b* of the stationary fixture 13 due to the biasing member 32 of the stationary fixture 13 biasing the gear 26 to the end 13*b*.

Figures 10, 11:
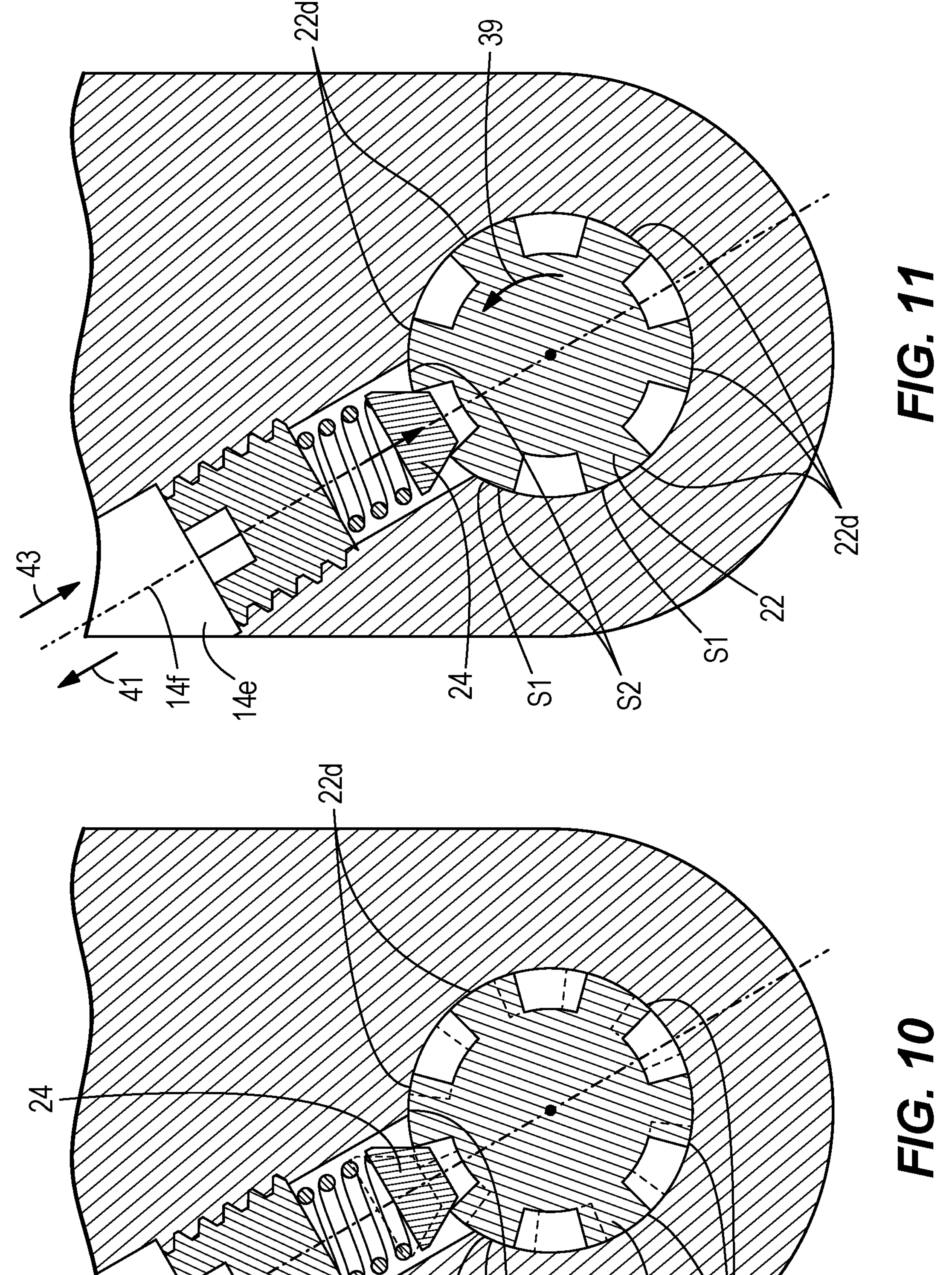
FIG. 10 illustrates a cross-section view through line 10-10 of FIG. 4 showing a plunger of the tool keeping a rotated position of the cam prior to indexing.
FIG. 11 illustrates a cross-section view through line 11-11 of FIG. 7 showing the plunger of the tool keeping a rotated position of the cam after indexing.

The processor 17 may then cause the machine 15 to move the tool holder 14 from the position of FIG. 6 in direction 37 parallel to axis 27 of the slot 13*a* of the stationary fixture 13 into the position of FIG. 7. The movement of the tool holder 14 in direction 37 may cause end 26*b* of the gear 26 to rotate in direction 39 around axis 25 as it meshes/mates with the rack 28 of the stationary fixture 13. As the gear 26 rotates in direction 39, the middle portion 26*a* of the gear 26 may move in direction 37 within the slot 13*a* of the stationary fixture 13. This may cause the entire gear 26 to move in direction 37. As the gear 26 rotates in direction 39 and simultaneously moves in direction 37, the attached cam 22 and attached cutting insert 18 may rotate with the gear 26 in direction 39 and may simultaneously move with the gear 26 in direction 37. This may cause the cutting insert 18 and cam 22 to index. This rotation of the cutting insert 18 may be allowed due to the cutting insert 18 being disposed outside of the interference fit of the pocket 14*b* of the tool holder 14. During this movement, the biasing member 20 of the tool 12 may remain compressed, while the biasing member 32 of the stationary fixture 13 may compress in direction 37 as the middle portion 26*a* of the gear 26 pushes the pin member 34 and the biasing member 32 in direction 37. As best shown in FIG. 11, as the cam 22 rotates in direction 39 the plunger 24 may retract along axis 14*f* in direction 41 and, due to the rotation of the cam 22 relative to the plunger 24, may then move in direction 43 to be disposed between a second set S2 of the mating members 22*d*, different from the first set 21 of the mating members 22*d*, to keep the rotated position of the cam 22 after the cutting insert 18 is indexed.

The processor 17 may then cause the machine 15 to move the tool holder 14 from the position of FIG. 7 in direction 45 away from the stationary fixture 13 into the raised position of FIG. 8. This movement of the tool holder 14 may cause the mating members 22*d* of the cam 22 to also move in direction 45 away from the stationary fixture 13 to again be disposed in spaced-apart relation directly over the mating members 26*d* of the gear 26 of the stationary fixture 13. In this position, the tool 12 may be spaced-apart from the stationary fixture 13. When the mating members 22*d* of the cam 22 are no longer in contact with the mating members 26*d* of the gear 26 of the stationary fixture 13, the biasing member 20 of the tool 12 may again force the cutting insert 18 back into the pocket 14*b* as the tool holder 14 moves in direction 45. This may cause the cutting insert 18 to again be held in the pocket 14*b* with an interference fit so that the cutting insert 18 may no longer rotate. At this time, the mating members 22*d* of the cam 22 may be disposed completely within the through-hole 14*a* of the tool holder 14 adjacent the end 14*d* of the tool holder 14. As best shown in FIG. 11, the plunger 24 may remain in its position between the second set S2 of the mating members 22*d* of the cam 22 keeping the rotated position of the cam 22 after the cutting insert 18 was indexed. The biasing member 32 of the stationary fixture 13 may for a moment remain compressed due to the force of the middle portion 26*a* of the gear 26 pushing the pin member 34 against the biasing member 32.

The biasing member 32 of the stationary fixture 13 may then cause the gear 26 of the stationary fixture 13 to move from its position of FIG. 8 into its position of FIG. 9 which matches the initial position of the gear 26 of the stationary fixture 13 in FIG. 4. The biasing member 32 of the stationary fixture 13 may push the pin member 34 and the middle portion 26*a* of the gear 26 in direction 33 to cause end 26*b* of the gear 26 to rotate in direction 47 around axis 25 as it meshes/mates with the rack 28. As the gear 26 rotates in direction 47, the middle portion 26*a* of the gear 26 may move in direction 33 within the slot 13*a* of the stationary fixture 13. This may cause the entire gear 26 to move in direction 33. During this movement of the gear 26 of the stationary fixture 13, the processor 17 may cause the machine 15 to keep the tool holder 14 in the raised position away from the stationary fixture 13. During this time, due to the biasing member 20 of the tool 14, the cutting insert 18 may be kept in its same position in the pocket 14*b* of the tool holder 14 with the interference fit preventing the cutting insert 18 from rotating. The mating members 22*d* of the cam 22 may remain completely disposed within the through-hole 14*a* of the tool holder 14 adjacent the end 14*d* of the tool holder 14. As best shown in FIG. 11, the plunger 24 may remain in its position between the second set S2 of the mating members 22*d* of the cam 22 keeping the rotated position of the cam 22 after the cutting insert 18 was indexed.

The processor 17 may then cause the machine 15 to move the tool holder 14 from the position of FIG. 9 in direction 33 back into its position relative to the stationary fixture 13 shown in FIG. 4. This may cause the entire tool 12 to be disposed in its same position relative to the stationary fixture 13 as shown in FIG. 4. The processor 17 may then cause the machine 15 to repeat the same process described above in FIGS. 4-11 to continually index the cutting insert 18 using the stationary fixture 13.

Figure 12:
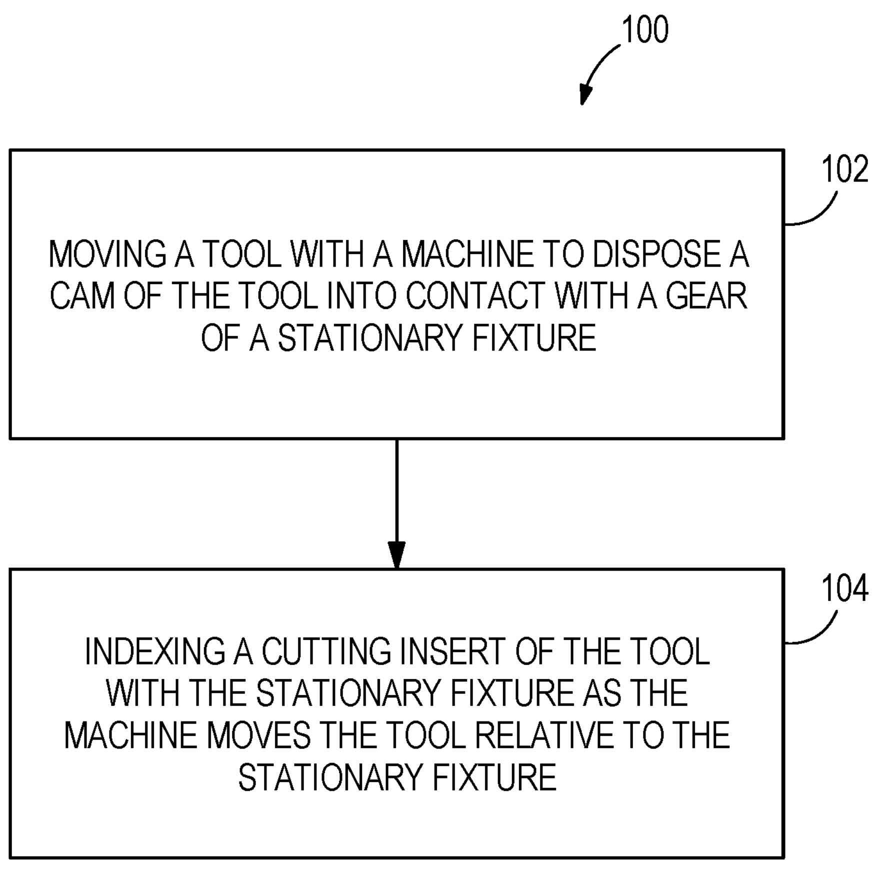
FIG. 12 illustrates a flowchart showing one embodiment of a method of indexing a cutting tool.

FIG. 12 illustrates one embodiment of a method 100 of indexing a cutting insert of a tool. The method 100 may utilize any of the embodiments of the cutting system of FIGS. 1-11. In other embodiments the method 100 may utilize varying cutting systems.

In step 102, the tool may be moved with a machine to dispose a cam of the tool into contact with a gear of a stationary fixture. Subsequently, in step 104, the cutting insert of the tool may be indexed with the stationary fixture as the machine moves the tool relative to the stationary fixture. Step 104 may be done automatically using the stationary fixture. The stationary fixture may be purely mechanical without any motor or electronic components.

In another embodiment, the method 100 may further comprise preventing rotation of the cutting insert within a pocket of a tool holder of the tool.

In an additional embodiment, the method 100 may further comprise moving a pocket of a tool holder relatively away from the cutting insert to allow the cutting insert to rotate. In one embodiment, the step of moving the pocket of the tool holder relatively away from the cutting insert may comprise the machine moving the tool holder relative to the cam of the tool while the cam of the tool is restrained against the gear of the stationary fixture causing the pocket of the tool holder to move relatively away from the cutting insert.

In yet another embodiment, step 104 may comprise the gear of the stationary fixture moving relative to a rack of the stationary fixture causing the cam to rotate which causes the cutting insert of the tool to index.

In an additional embodiment, the method 100 may further comprise keeping a rotated position of the cam with a plunger after the cutting insert is indexed.

In another embodiment, the method 100 may further comprise the machine moving a tool holder of the tool away from the stationary fixture and a biasing member of the tool moving the cutting insert into a pocket of the tool holder to prevent the cutting insert from rotating.

In still another embodiment, the method 100 may further comprise a biasing member of the stationary fixture moving the gear of the stationary fixture relative to the stationary fixture.

In an additional embodiment, the method 100 may further comprise any of the steps of operating the cutting system of FIGS. 1-11 as described above.

In other embodiments, one or more steps of the method 100 may vary in substance and/or in order, one or more steps of the method 100 may not be followed, and/or one or more additional steps may be added to the method 100.

The cutting systems and methods described herein may utilize purely mechanical stationary fixtures to automatically index their cutting inserts. This may result in a reduction of manufacturing cost, a reduction in repair cost, and less down-time of the cutting system.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true scope of the subject matter described herein. Furthermore, it is to be understood that the disclosure is defined by the appended claims. Accordingly, the disclosure is not to be restricted except in light of the appended claims and their equivalents.

The invention claimed is:

1. A cutting system comprising:

a tool comprising a cam connected with a cutting insert;

a stationary fixture spaced apart from the tool, the stationary fixture comprising a gear moveable within the stationary fixture; and a machine, the machine configured to move the cam of the tool into contact with the stationary fixture such that movement of the gear causes the cam to move and index the cutting insert.

2. The cutting system of claim 1 wherein the tool further comprises a plunger disposed against the cam, the plunger moveable relative to the cam and configured to keep a rotated position of the cam after the cutting insert is indexed.

3. The cutting system of claim 1 wherein the stationary fixture further comprises a rack-and-gear, the rack configured to rotate the gear, the gear configured to rotate the cam causing the cutting insert to index.

4. The cutting system of claim 3 wherein the stationary fixture further comprises a biasing member that biases the gear relative to the rack.

5. The cutting system of claim 1 wherein the tool comprises a tool holder comprising a pocket, the cutting insert disposed within and against the pocket with an interference fit preventing the cutting insert from rotating relative to the pocket, the pocket configured to be relatively moved away from the cutting insert allowing the cutting insert to rotate.

6. The cutting system of claim 5 wherein the tool comprises a biasing member biasing the cutting insert towards the pocket.

7. A cutting system comprising:

a machine;

a tool comprising a cutting insert and a cam connected with the cutting insert; and a stationary fixture spaced apart from the tool, the stationary fixture comprising a gear moveably mated with a rack;

wherein the machine is configured to move the cam of the tool into contact with the stationary fixture; and further move the tool such that the rack rotates the gear; and wherein rotation of the gear causes the cam to rotate and index the cutting insert.

8. The cutting system of claim 7 wherein the tool further comprises a plunger disposed against the cam, the plunger moveable relative to the cam and configured to keep a rotated position of the cam after the cutting insert is indexed.

9. The cutting system of claim 7 wherein the stationary fixture further comprises a biasing member that biases the gear relative to the rack.

10. The cutting system of claim 7 wherein the tool further comprises a tool holder comprising a pocket, the cutting insert disposed within and against the pocket with an interference fit preventing the cutting insert from rotating relative to the pocket, the pocket configured to relatively move away from the cutting insert allowing the cutting insert to rotate.

11. The cutting system of claim 10 wherein the tool further comprises a biasing member that biases the cutting insert towards the pocket.

12. A method of indexing a cutting insert of a tool comprising:

moving the tool with a machine to dispose a cam of the tool into contact with the stationary fixture; and subsequently moving the tool relative to the stationary fixture such that a gear of the stationary fixture rotates and causes the cam of the tool to rotate and index the cutting insert.

13. The method of claim 12 further comprising preventing further rotation of the cutting insert within a pocket of a tool holder of the tool.

14. The method of claim 12 further comprising moving a pocket of a tool holder relatively away from the cutting insert to allow the cutting insert to rotate.

15. The method of claim 14 wherein the moving the pocket of the tool holder relatively away from the cutting insert comprises the machine moving the tool holder relative to the cam of the tool while the cam of the tool is restrained against the gear of the stationary fixture causing the pocket of the tool holder to move relatively away from the cutting insert.

16. The method of claim 12 wherein the subsequently moving the tool relative to the stationary fixture such that a gear of the stationary fixture rotates and causes the cam of the tool to rotate and index the cutting insert comprises the gear of the stationary fixture moving relative to a rack of the stationary fixture causing the cam to rotate which causes the cutting insert of the tool to index.

17. The method of claim 12 further comprising keeping a rotated position of the cam with a plunger after the cutting insert is indexed.

18. The method of claim 12 further comprising the machine moving a tool holder of the tool away from the stationary fixture and a biasing member of the tool moving the cutting insert into a pocket of the tool holder to prevent the cutting insert from rotating.

19. The method of claim 12 further comprising a biasing member of the stationary fixture moving the gear of the stationary fixture relative to the stationary fixture.

* * * * *